No. 651,987. Patented June 19, 1900.
A. C. BRANTINGHAM.
SEPARATING AND BOLTING MACHINE.
(Application filed July 3, 1899.)
(No Model.) 6 Sheets—Sheet 2.

WITNESSES:
C. S. Frye.
J. A. Walsh.

INVENTOR
Allen C. Brantingham,
BY
Chester Bradford,
ATTORNEY.

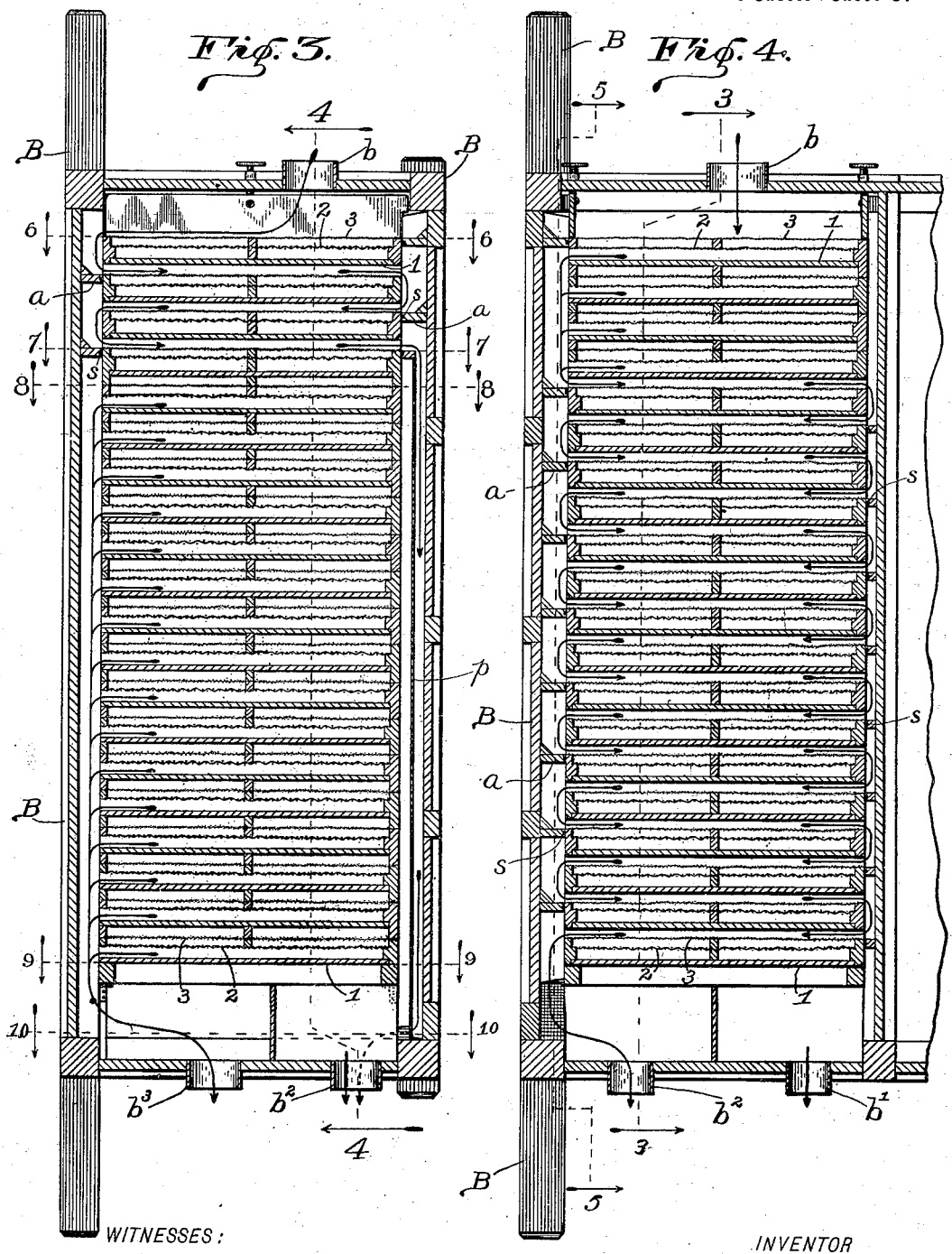

No. 651,987. Patented June 19, 1900.
A. C. BRANTINGHAM.
SEPARATING AND BOLTING MACHINE.
(Application filed July 3, 1899.)
(No Model.) 6 Sheets—Sheet 4.
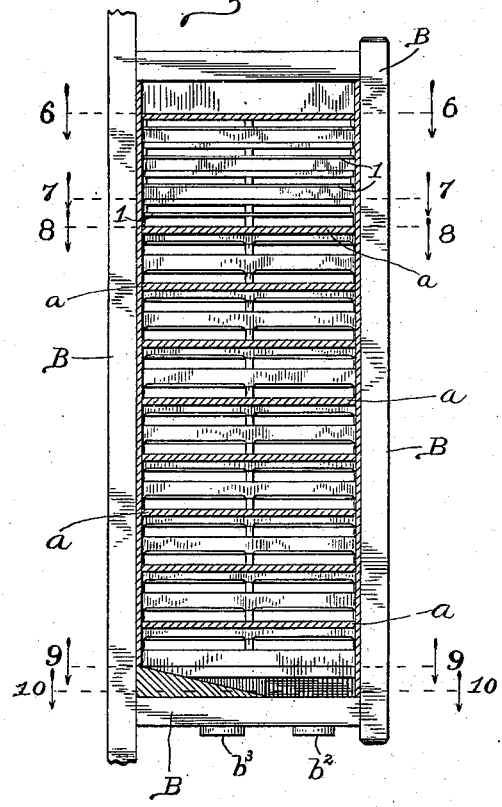
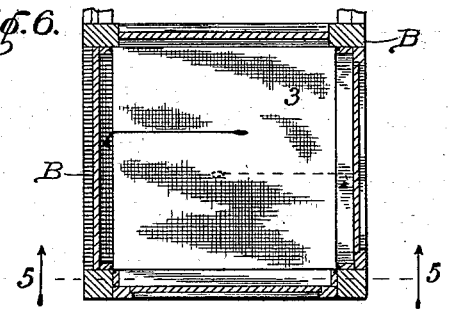
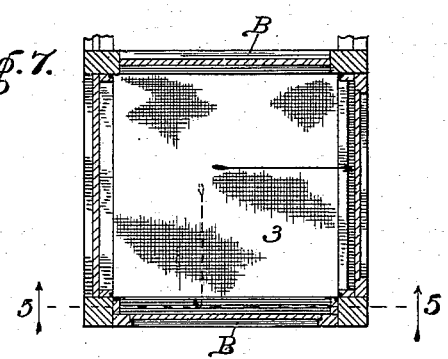
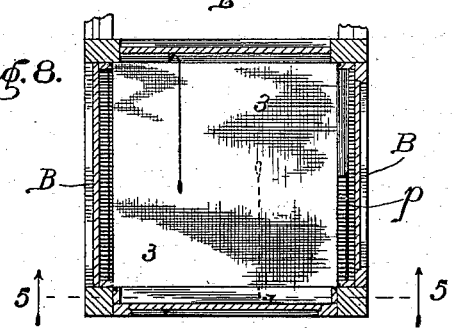
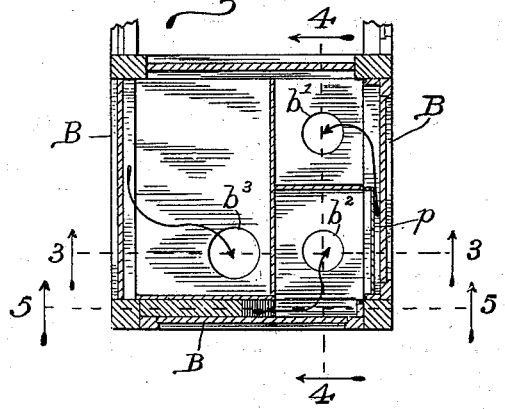
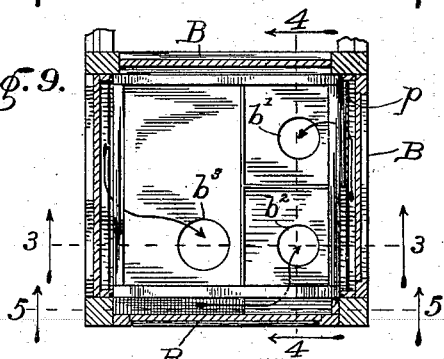
WITNESSES:
C. S. Frye.
J. A. Walsh.
INVENTOR
Allen C. Brantingham,
BY
Chester Bradford,
ATTORNEY.

No. 651,987. Patented June 19, 1900.
A. C. BRANTINGHAM.
SEPARATING AND BOLTING MACHINE.
(Application filed July 3, 1899.)

(No Model.) 6 Sheets—Sheet 5.

WITNESSES:
C. S. Frye.
J. A. Walsh.

INVENTOR
Allen C. Brantingham,
BY
Chester Bradford,
ATTORNEY.

No. 651,987. Patented June 19, 1900.
A. C. BRANTINGHAM.
SEPARATING AND BOLTING MACHINE.
(Application filed July 3, 1899.)

(No Model.) 6 Sheets—Sheet 6.

WITNESSES: INVENTOR
C. S. Frye. Allen C. Brantingham,
J. A. Walsh. BY Chester Bradford,
ATTORNEY.

UNITED STATES PATENT OFFICE.

ALLEN C. BRANTINGHAM, OF TOLEDO, OHIO, ASSIGNOR TO THE NORDYKE & MARMON COMPANY, OF INDIANAPOLIS, INDIANA.

SEPARATING AND BOLTING MACHINE.

SPECIFICATION forming part of Letters Patent No. 651,987, dated June 19, 1900.

Application filed July 3, 1899. Serial No. 722,689. (No model.)

*To all whom it may concern:*

Be it known that I, ALLEN C. BRANTINGHAM, a citizen of the United States, residing at Toledo, in the county of Lucas and State of Ohio, have invented certain new and useful Improvements in Separating and Bolting Machines, of which the following is a specification.

The object of my said invention is to provide, in compact form, a machine by which stock may be graded and separated to any desired extent.

It consists, generally speaking, in a suspended frame designed to have a gyratory motion and said frame carrying partitions by which it is divided into compartments and series of comparatively small and preferably square sieves placed in said compartments, with conduits alongside said sieves, said conduits being interrupted at various points by horizontal partitions forming pockets, whereby the material is guided back and forth through and among the sieves, according to the arrangement thereof, as and to the extent which may be desired, all as will be hereinafter more particularly described and claimed.

Figure 1:
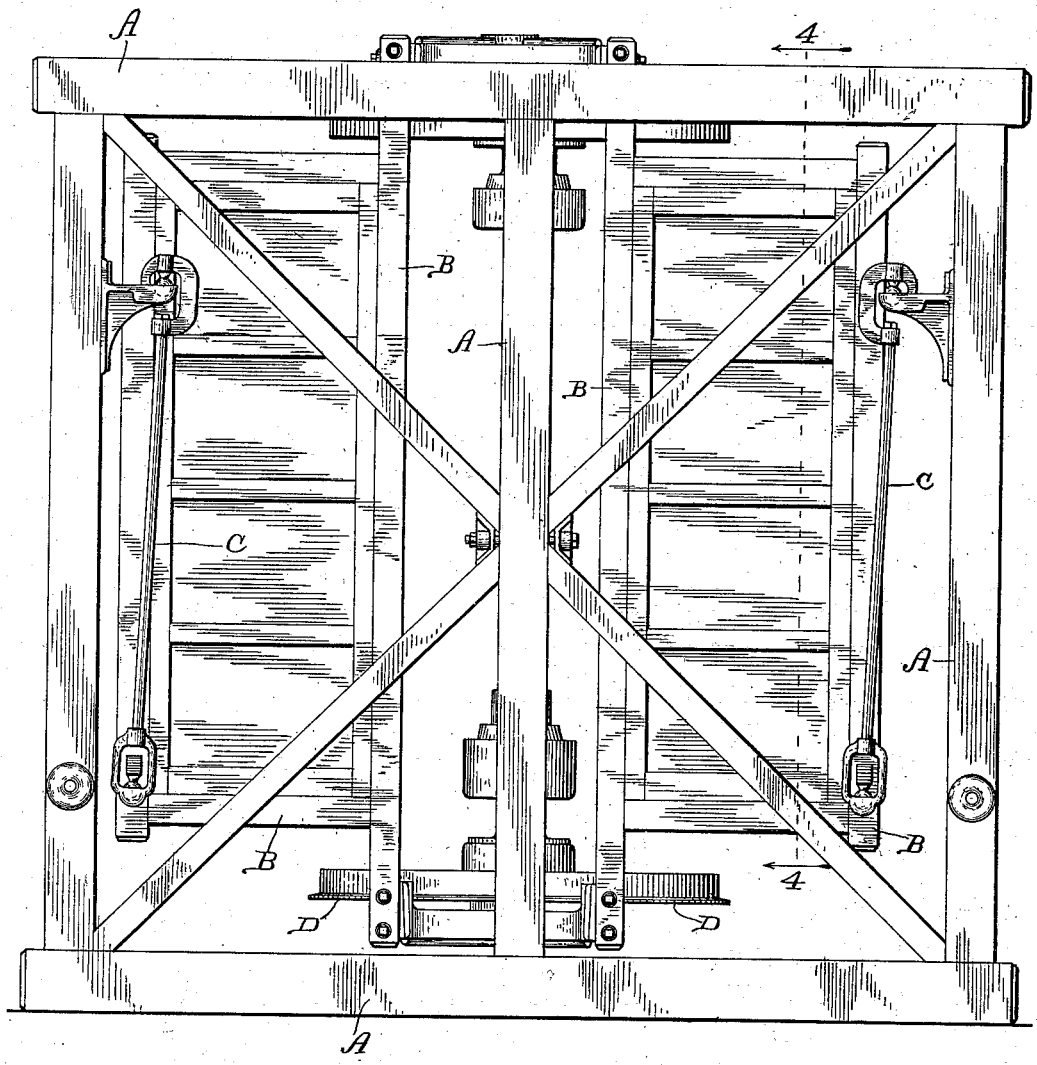
Figure 2:
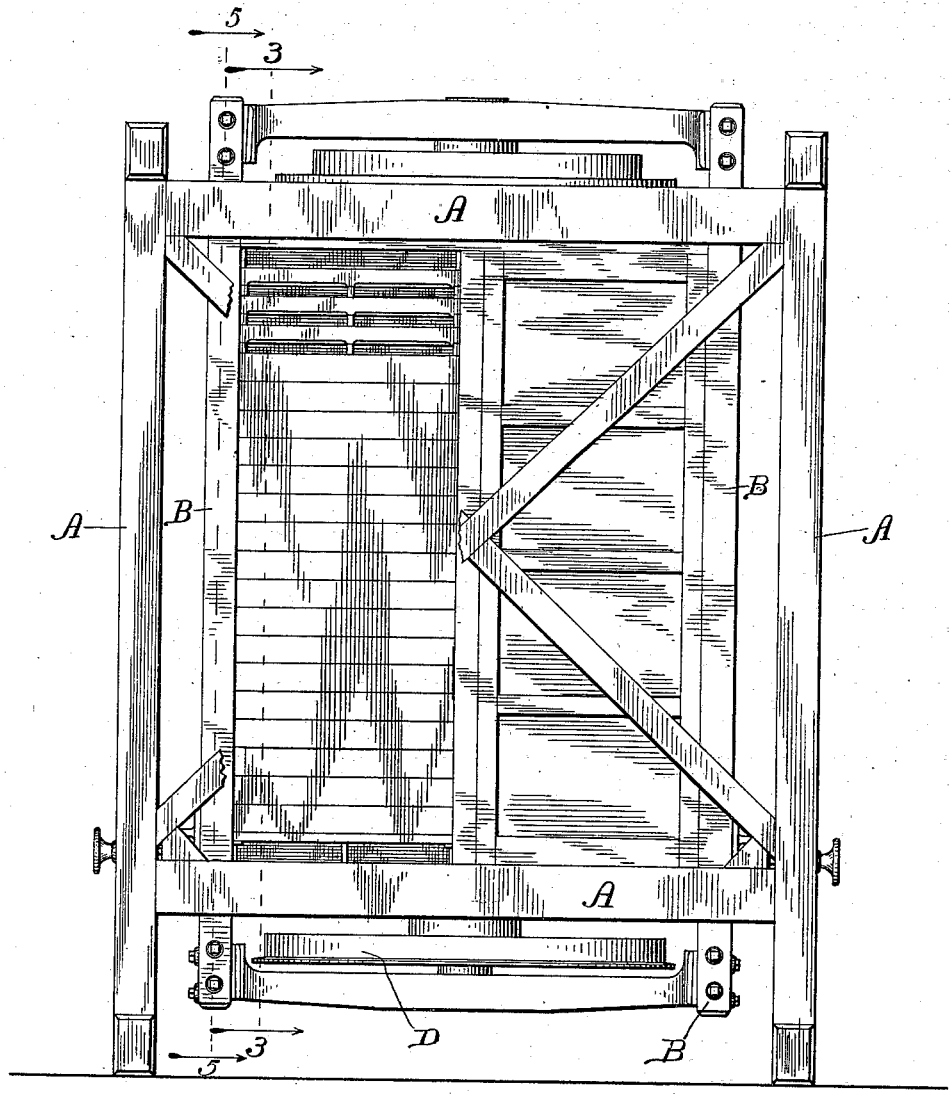
Figure 11:
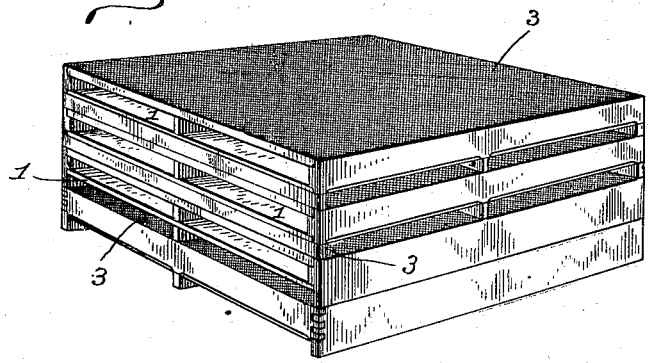
Figure 12:
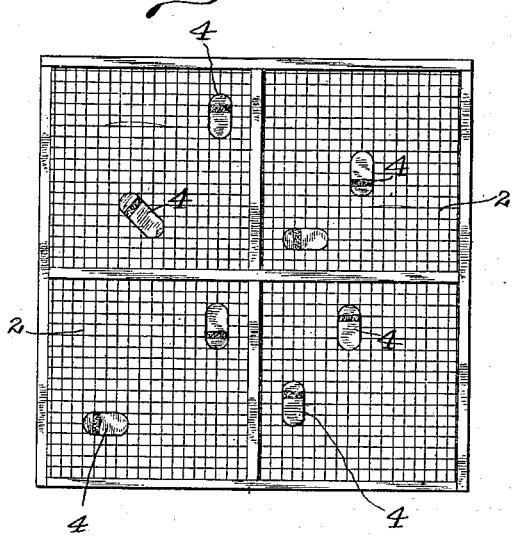
Figure 13:
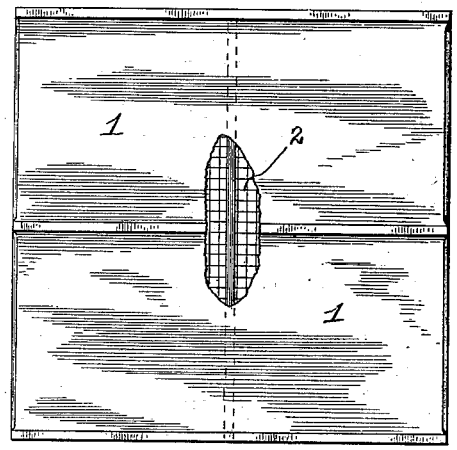
Figure 14:
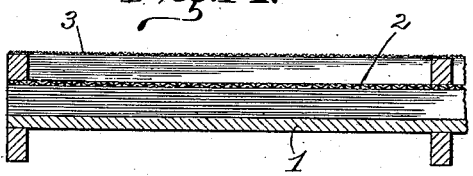
Figure 15:
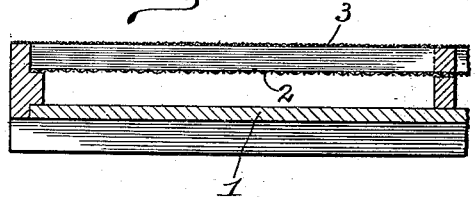
Figure 16:
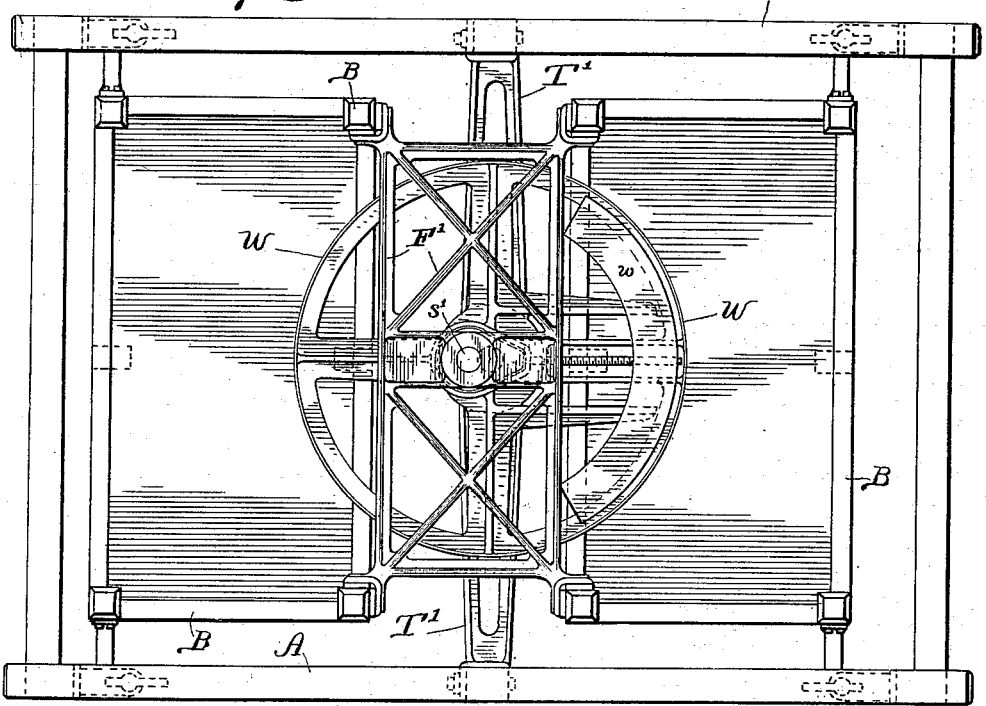
Figure 17:
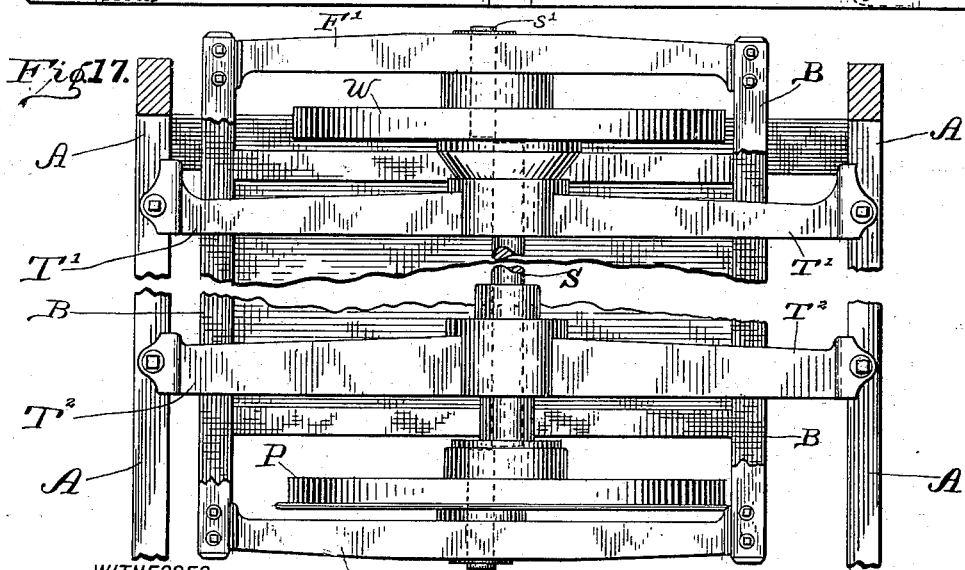

Referring to the accompanying drawings, which are made a part hereof and on which similar reference characters indicate similar parts, Figure 1 is a side elevation of a machine of the character I design to employ in carrying out my invention, said machine being divided, in the form shown, into four sections or compartments; Fig. 2, an end elevation of the same, the outer wall on one side being broken away to show the set of sieves used in one arrangement in one of the compartments; Fig. 3, a vertical sectional view through one section of the sieves and the adjacent parts, on an enlarged scale, as seen from the dotted line 3 3 in Figs. 2 and 4; Fig. 4, a similar view as seen from the dotted line 4 4 in Fig. 3; Fig. 5, a vertical sectional view through the pockets in the frame alongside the sieves and looking inwardly toward said sieves from the dotted line 5 5 in Figs. 2, 4, and 6 to 10, inclusive; Figs. 6, 7, 8, 9, and 10, horizontal sectional views looking downwardly from the dotted lines 6 6, 7 7, 8 8, 9 9, and 10 10, respectively, in Figs. 3 and 5; Fig. 11, a perspective view of a group of four sieves, one arranged upon the other separately or removed from the machine; Fig. 12, a plan view of one of said sieves separately, the upper or fine sieve-cloth being removed; Fig. 13, an under side plan view of such a sieve, a fragmemt being broken out of the bottom, showing the partition and coarse sieve or reticulated floor above; Fig. 14, a detail sectional view, on a still further enlarged scale, of a fragment of one sieve separately, the same being practically a reproduction, on a larger scale, of one of the sieves, as shown in Fig. 3; Fig. 15, a similar view of a fragment of one of the sieves, as shown in Fig. 4; Fig. 16, a top or plan view of the machine, and Fig. 17 a sectional view showing how the sieve structures are driven from the crank-shaft.

This machine is, generally speaking, of that class or type wherein the sifting or bolting and separating or grading of the stock results from the shaking of the sieves due to a gyratory motion imparted to the structure containing such sieves from some suitable source of power. I have illustrated, especially in Figs. 1 and 2 of the drawings, a stationary frame A and a sieve-structure frame B, suspended thereto by suitable carrying links or rods C. The sieve-structure frame B is ordinarily driven from a central point, and I have shown a band wheel or pulley P as the means by which and a suitable band or belt motion is imparted to this structure. This pulley is mounted on a shaft S, which has bearings near the upper and lower ends in bridge-trees T' T², which bridge-trees are attached at their ends to the frame A. Said shaft is a crank-shaft, and its wrists $s'$ $s^2$ extend into bearings in the rigid frames F' and F², to which the sieve-structure frames B are securely and rigidly connected. As the shaft S revolves it of course, through the frames F' and F², propels the sieve structures B with a gyratory motion, said sieve structures being suspended, as above stated, on the carrying links or rods C. In order to secure an evenness of motion, I prefer to use a balance-wheel W, which carries a weight $w$ on the side of the shaft S opposite the wrist-pins, for purposes which will be readily understood. These matters, however, are not the subject-matter of my present invention and are merely outlined to indicate the character of the complete structure in which my invention is embodied. In Fig. 2 a portion of the frame is broken away and one side of one of the sections of the structure B is taken out or removed, disclosing a set of sieves embodying a construction suitable to my present invention and showing an arrangement of such sieves by which my invention may be carried out. The views Figs. 3 to 10, inclusive, show this arrangement more in detail, while Figs. 11 to 15 show the construction of the sieves themselves, Fig. 11 also showing the arrangement at the point where the flow of material is "changed." As will be seen, the work is accomplished by means of a considerable number of comparatively-small rectangular sieves which are preferably made of the same diameter in both directions or, as nearly as possible, exactly square. These sieves vary somewhat in structural arrangement—i. e., the sides and partitions are differently positioned in some cases from what they are in others in order to guide the stock in the desired direction; but the general character of all is the same. Each sieve is composed of an imperforate bottom 1, a coarse intermediate perforated or reticulated floor 2, preferably formed from wire cloth, and a sieve or screen 3, preferably formed from silk or wire cloth, with suitable sides, partitions, and divisions, whereby the said bottom, intermediate floor, and sieve are sufficiently separated from each other, leaving intervening spaces or passages through which the stock or material being treated may pass on its way through the machine. This construction, as above stated, is best illustrated in Figs. 11 to 15, inclusive. Resting upon the perforated intermediate floor 2 and bearing against the under side of the sieve 3 are a number of agitating and cleaning devices 4, as best shown in Fig. 12, these being the principal subject-matter of Letters Patent of the United States No. 606,742, dated July 5, 1898.

The sieves may be arranged in many ways, according to the treatment of stock or material desired, by varying the partitions and pockets and shifting the positions of the sieves. In order, however, to avoid confusion, I have in this case illustrated my invention in its simplest form, in which the direction of the stock or material is changed but once in passing through the complete set of sieves and in which the stock or material is divided into but three parts. This operation will be best understood by reference to Figs. 3 to 10, inclusive, where by means of arrows the travel of the stock or material has been distinctly indicated. The stock is indicated as entering the machine through an opening in the top, where I prefer to provide a thimble or neck $b$, to which a spout may lead from the source of supply. As best shown in Fig. 3, the stock falls upon the upper cloth surface of the first sieve through which the finer material passes, while the unbolted material or stock tails over the edge of the upper sieve into a pocket in the frame and thence turns back in an opposite direction onto the cloth of the second sieve, as indicated by the first arrow in Fig. 3. This unbolted stock then tails over the second sieve onto the top of the third sieve in like manner as before, as indicated by the second arrow in Fig. 3. Thence it passes through another pocket onto the top of the fourth sieve in manner as before, as indicated by the third arrow, after which, the finer material having by this time been properly separated therefrom, what remains tails off into an outside deep pocket in the frame, (in the construction shown behind the thin partition $p$,) down which it falls, as indicated by the fourth arrow in Fig. 3, from which it passes out of the machine through the discharge orifice or neck $b'$, as indicated in Figs. 4, 9, and 10. This material may be scalped, graded, or dusted stock, according to the class of work being done, and more or less sieves may of course be employed, as desired. The cloth on the four sieves just spoken of is generally coarser than the cloth of the succeeding sieves. The material which has passed through the cloth passes on also through the perforated or reticulated intermediate floors of the sieves down onto the imperforate bottoms thereof. This material travels at right angles with the path of the unbolted material just described and tails off from each of the several bottoms into a single pocket, as shown at the left hand near the upper end of Fig. 4, and passes thence around onto the cloth of the next succeeding sieve, as indicated by the arrow having four tails at the point spoken of. This material then passes back and forth over the remaining sieves of the structure, (in the arrangement illustrated in the drawings,) each of the sieves taking out some portion of the finer material until finally the fine product is all separated, when what remains drops down and passes out of the machine through the discharge orifice or neck $b^2$. This material is generally what is known as "middlings." Returning again to Fig. 3, the fine product, which falls through the fine sieves, tails off into a long deep pocket, as shown by the long arrow with sixteen tails, and finally passes out of the machine through a discharge orifice or neck $b^3$. This product is commonly in ordinary milling operations the finished flour.

It will be observed that in the arrangement shown in the drawings the fifth sieve from the top is what I have denominated a "direction-changing" sieve, the arrangement of which is such that the side at which the material which has passed through the sieve-cloth is delivered is at right angles from the side at which the corresponding material has been delivered by the set of sieves above—that is to say, the material, including the coarse bran, (when looking at the machine as shown in all the figures of the drawings except Figs. 1 and 4,) travels first to the left, thence to the right, thence back to the left, and thence to the right, when the remaining material is discharged from the machine. At the same time that portion of the material which has been sifted is traveling at right angles therewith, as indicated at the top of Fig. 4, this material being upon the bottoms of the upper screens. Said material is then shifted from the bottoms to the tops and travels in the same direction, while the fine material, which drops onto the bottoms of the succeeding screens, is traveling to the left in the position shown in Fig. 3, this being the product or flour. In other words, the coarse material—stock or bran—and the fine material—flour or product—travel back and forth across the machine in one direction, while the intermediate material or middlings travels back and forth in the other direction or at right angles therewith, and the finer material of the upper set of sieves becomes the coarser material of the lower set of sieves, and the position is changed from the floors of the sieves to the upper side of the sieve-cloth. In the group of sieves shown in Fig. 11 the upper two are the two lower sieves of the upper group of four as the sieves are arranged in the machine illustrated. The next lower one is the direction-changing sieve, and the lowest sieve shown in said Fig. 11 is the upper one of the lower or finishing group. In every case it must be borne in mind that the product of any given sieve travels at right angles to the stock passing over said sieve.

I have said that in the arrangement shown the fifth sieve is the one which is denominated a "direction-changing" sieve. This statement requires some explanation. The product of the first group of four sieves passes onto and travels over the cloth of which the fifth sieve is the first, while the product of the fifth and succeeding sieves travels in a direction at right angles with the product of the first set of sieves. This product of the first set while shifted in passing onto the first sieve of the next set is given its new direction by side pieces secured to the under side of the last sieve of the first set, so that these side pieces serve as the sides of the chamber of which the cloth of the sieve below them forms the bottom. The fifth sieve, therefore, is the direction-changing sieve in the sense that the change of direction takes place on it, while said change of direction at the same time is directed by the strips connected to and forming a part of the structure of the lower sieve of the preceding set, and therefore in denominating either the last sieve of one set or the first sieve of the next set a "direction-changing" sieve the definition is somewhat arbitrary, as the two sieve structures coöperate to produce the result.

It will be observed that the sieves in the machine illustrated are in three divisions. The first group is illustrated as composed of four sieves, which number will ordinarily be found sufficient to scalp off the coarse stock. Next is the direction-changing sieve, by which the direction of travel of the material coming onto it is changed. Below this direction-changing sieve the remainder of the sieves are shown as all alike and all performing the same work, which generally consists in separating the "product" or fine flour from the coarser material or middlings. It is, however, entirely practicable to insert in the assemblage of sieves two or three or more direction-changing sieves, in which case the intermediate material or middlings will be divided into two or three or more grades, this being regulated and determined by the number of direction-changing sieves and the fineness of the sieve-cloth of the different groups, it being customary and desirable to use a finer grade on those sieves below and including each direction-changing-sieve than is used on the sieves above it.

The pockets in the sieve structure alongside the sieves are formed by putting in suitable horizontal partitions or shelves $a$, which extend from the outer wall into and come in contact with the edges of the sieves. Close joints are obtained by inserting in the edges of these shelves or horizontal partitions or pocket-floors strips $s$ of felt, plush, wool, or such like material.

The machine as a whole provides in a comparatively-small space a means by which the separation of mill products into various grades is efficiently secured and whereby at any desired point of separation certain of the material may be scalped off and led to the bottom of the machine, whence it emerges through suitable discharge-orifices, while the remainder is started over another set of sieves of a different grade of fineness for further separation, each separation being finally led out of the machine through suitable discharges and discharge-orifices.

As is obvious, with a machine of my invention the amount of sieve-surface for any one of the separations may be readily increased or diminished by increasing or decreasing the number of sieves for such separation and changing the positions of the direction-changing sieves accordingly. While four sieves, for example, are shown in the first set above the direction-changing sieve, it is perfectly clear that either a larger or a smaller number may be used at will, this being a mere matter of choice or judgment.

Having thus fully described my said invention, what I claim as new, and desire to secure by Letters Patent, is—

1. The combination, in a separating and bolting machine with a sieve structure and means for imparting a gyratory movement thereto, of a set of sieves arranged one above another, each sieve being composed of an imperforate bottom, a perforated intermediate floor, and a sieve-cloth top with suitable sides and partitions, with cloth-cleaners interposed between said top and said intermediate floor, the several sieves being adapted to discharge the coarse material from off the top of the sieves in one direction and the finer material which has passed through the sieves in another direction at right angles therewith; and pockets in the surrounding structure, certain of said pockets being adapted to return the material into the machine for further treatment, and certain of the pockets leading to the bottom of the structure and communicating with discharge-orifices, whereby any desired separation of the material may be secured in a limited horizontal space, substantially as set forth.

2. The combination, in a separating and bolting machine, of a frame and casing wherein the casing sides are provided with shelves or pocket-bottoms, means for imparting a gyratory movement thereto and a series of sieves set within said frame and casing the sides whereof when in position come in contact with said shelves or partitions, said sieves having openings in their ends which communicate with the spaces or pockets thus formed in said sides, and arranged as described, whereby a portion of the material in passing through the machine is separated from another portion and led off and discharged in one direction, while the remainder is led off in a direction at right angles therewith and discharged separately at other points.

3. The combination, in a separating and bolting machine, of a sieve structure wherein the frame or casing is substantially rectangular in form and is of considerable height in proportion to its horizontal dimensions and is provided with recesses or pockets around its inner sides, means for imparting a gyratory movement thereto, and a series of sieves the bottoms whereof are level mounted within said structure between said pockets, the tops of said sieves being arranged to discharge into certain of said pockets, and the bottoms of said sieves being arranged to discharge in a direction at right angles thereto into other pockets, and certain of said pockets being arranged to return the material into the sieves for further treatment, while others lead to the bottom of the structure and communicate with discharge-orifices, said sieves being adapted to be shifted into various positions whereby any desired separation of the material may be secured.

4. The combination, in a separating and bolting machine, of a suitable frame, means for imparting a gyratory movement thereto and sets of sieves within said frame, each set of sieves being separated by a direction-changing sieve, whereby the stock passing over the sieves is caused to travel over the same in one direction, and the product passing through the sieves is caused to travel in a direction at right angles thereto, said frame having suitable pockets to receive the separated products, substantially as set forth.

5. The combination, in a separating and bolting machine, of a suitable frame, means for imparting a gyratory movement thereto, and a series of sieves within said frame each sieve having a level floor with side pieces inclosing the space between the sieve and its floor, said side pieces being arranged as described, whereby that coarse portion of the stock which passes over the sieves is caused to discharge at points at right angles to the points where the finer product which passes through the sieve is discharged, substantially as set forth.

6. The combination, in a separating and bolting machine, of a square frame adapted to receive a series of sieves, and a series of square sieves formed to fit therein and adapted to be shifted around to discharge in different directions.

7. The combination, in a separating and bolting machine, of a stationary framework, a movable sieve structure suspended therein by means of carrying rods or links, a central shaft mounted in bearings carried by the stationary frame and provided with wrists at its ends which wrists enter bearings on the suspended sieve structure, said sieve structure containing suitable shoes for a series of removable and shiftable square sieves, and suitable pockets in the spaces alongside said sieves to receive the product discharged therefrom.

In witness whereof I have hereunto set my hand and seal, at Toledo, Ohio, this 24th day of June, A. D. 1899.

ALLEN C. BRANTINGHAM. [L. S.]

Witnesses:
JOHN F. BATZOLD,
EUGENE KANE.